United States Patent [19]
Ralbovsky

[11] 3,968,679
[45] July 13, 1976

[54] PNEUMATIC THICKNESS SENSOR HEAD

[75] Inventor: Frank Stephen Ralbovsky, Schenectady, N.Y.

[73] Assignee: General Electric Company, New York, N.Y.

[22] Filed: Dec. 9, 1974

[21] Appl. No.: 530,876

[52] U.S. Cl............................ 73/37.7; 33/DIG. 2; 226/22; 226/45
[51] Int. Cl.[2].................. G01B 13/06; B65H 25/08
[58] Field of Search................. 73/37.5, 37.6, 37.7, 73/37.8, 388 BN; 33/174 H, DIG. 2; 226/22, 45

[56] References Cited
UNITED STATES PATENTS

| | | | |
|---|---|---|---|
| 1,161,753 | 11/1915 | Thompson | 33/174 H |
| 1,691,772 | 11/1928 | Maas | 226/22 |
| 2,539,131 | 1/1951 | Gundersen et al. | 226/22 X |
| 2,831,257 | 4/1958 | Aller | 33/DIG. 2 X |
| 3,104,473 | 9/1963 | Rose | 33/194 X |
| 3,340,886 | 9/1967 | Jacobsen | 73/37.7 X |

OTHER PUBLICATIONS

Continuous Calibrating Device for Bands or Wires; ETAMIC; Ateliers de Normandie; Rfc'd in office 3-20-51.

Primary Examiner—Richard C. Queisser
Assistant Examiner—John S. Appleman
Attorney, Agent, or Firm—Stephen A. Young; Walter C. Bernkopf; Robert A. Cahill

[57] ABSTRACT

A pneumatic sensor head for monitoring the thickness of a continuously moving sheet of material passing therethrough. The sensor head is comprised of first and second blocks having respective first and second aligned nozzles separated by a distance sufficient to receive the sheet of material passing therethrough. The sensor head is further comprised of means for admitting pressurized fluid to the first and second nozzles to sense an average variation in the back pressure therefrom proportional to a change in the thickness of the sheet material being monitored. A plurality of removable stacked laminated sheets is positioned between the first and second blocks for adjusting the distance between the first and second nozzle, whereby to enable operation of the sensor head over wide variations in nominal thickness of monitored sheets of material.

3 Claims, 3 Drawing Figures

PNEUMATIC THICKNESS SENSOR HEAD

BACKGROUND OF THE INVENTION

1. Field of The Invention

This invention relates to a pneumatic sensor head for monitoring the thickness of a continuously moving sheet of material passing therethrough, and, more particularly, to a pneumatic sensor head which is capable of operating over wide variations in nominal thicknesses of monitored sheets of material.

2. Description Of The Prior Art

Prior art pneumatic sensor heads for monitoring the thickness of a continuously moving sheet of material, comprising first and second nozzles separated by a distance sufficient to receive the sheet material passing therethrough, are known. In these devices, a pressure signal is supplied to the nozzles. The back pressure from the nozzles is monitored, and provides an indication of the thickness of the material, since variations in back pressure are known to be proportional to variations in thickness of the material. However, in order to obtain predictable linear measurements, the clearance between each nozzle and the material passing between the nozzles must be less than ten percent of the diameter of the adjacent nozzle. Thus, a pneumatic sensor head, which is comprised of a pair of aligned nozzles that are separated by an unadjustable fixed distance, is only useful to monitor material within a very limited range of a nominal material thickness. This causes a business operation to stock a large number of sensor heads, wherein each sensor head would be used to monitor the thickness of a sheet of material over a specified nominal range. The stocking of sensor heads for the above purpose is obviously impractical and expensive.

In order to overcome the above disadvantage of having to stock a plurality of sensor heads in order to monitor sheet material over a wide nominal thickness range, sensor heads have been developed which allow the nozzles to be movable to enable the separation therebetween to be adjusted with the use of a feeler gauge. The use of a feeler gauge has a disadvantage in that each time the gap between the nozzles of a sensor head is readjusted to be the same as a previous nominal thickness setting, the latter monitored nominal thickness measurement may not be identical to the previous monitored nominal thickness measurement, since feeler gauge adjustments can vary and are not very reliable. Furthermore, adjustable nozzles require flexible tubing or connections, and if the connections are loosened and slip, the nozzle setting can change. This is particularly true under conditions where the sheet of material may inadvertently be repeatedly impacting with one or both nozzles.

OBJECTS OF THE INVENTION

It is therefore an object of this invention to provide for an improved pneumatic sensor head for monitoring the thickness of continuously moving sheet material having none of the disadvantages described above.

It is another object of this invention to provide for an improved pneumatic thickness gauge having no moving parts which is easily adaptable to measure the thickness of various sheets of material, wherein the nominal thickness of one sheet and the nominal thickness of another sheet can vary over a wide range.

It is another object of this invention to provide a pneumatic thickness gauge which is capable of so adjusting the distance or gap between two aligned nozzles in such a manner that positive replication of a previous gap setting can be made to insure precise replication of measurements.

Other objects of the invention will be pointed out hereinafter.

SUMMARY OF THE INVENTION

According to a broad aspect of the invention, there is provided a pneumatic sensor head for monitoring the thickness of a continuously moving sheet of material. The sensor head is comprised of first and second blocks having respective first and second aligned nozzles separated by a distance sufficient to receive the sheet material passing therethrough, and means for admitting pressurized fluid to the first and second nozzles to sense an average variation in the back pressure therefrom proportional to a change in the thickness of the sheet of material being monitored. The sensor head is further comprised of a plurality of removable stacked laminated sheets positioned between the first and second blocks for adjusting the distance between the first and second nozzles, whereby to enable operation of the sensor head over wide variations in thicknesses of monitored sheets of material.

DESCRIPTION OF THE PREFERRED EMBODIMENT

Figure 1:
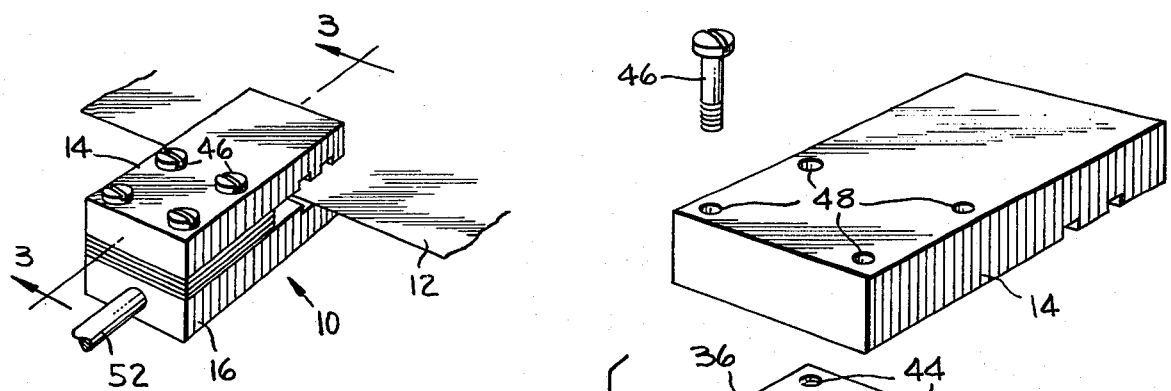
FIG. 1 is a perspective view of a pneumatic sensor head for monitoring the thickness of a continuously moving sheet of material in accordance with this invention.
Figure 2:
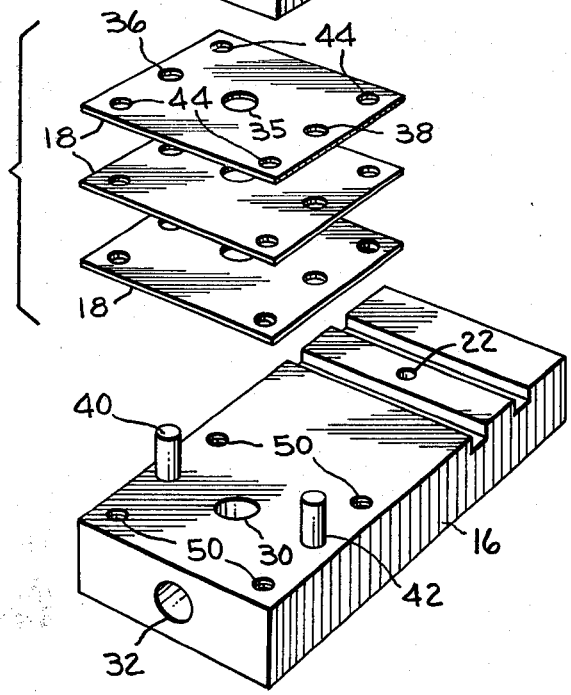
FIG. 2 is an exploded perspective view of the sensor head shown in FIG. 1.
Figure 3:
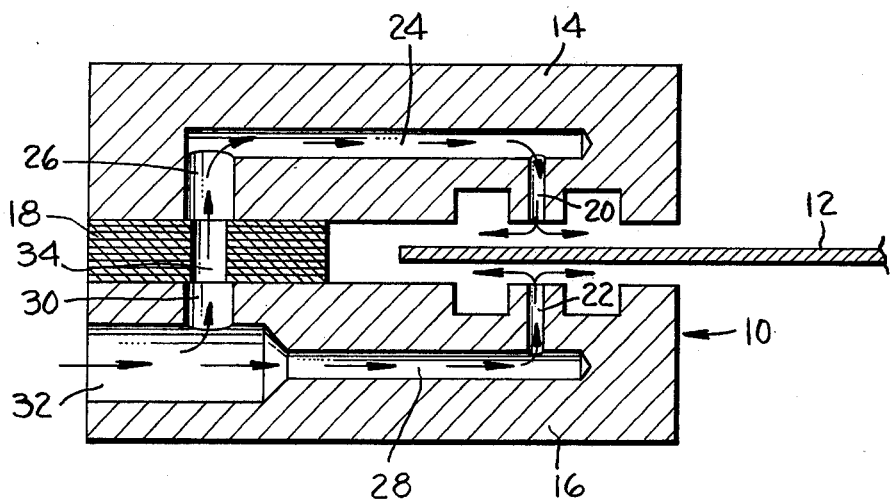
FIG. 3 is a cross-sectional view of the sensor head shown in FIG. 1 taken along lines 3—3.

Referring to FIGS. 1 through 3, the pneumatic sensor head 10 for monitoring the thickness of a continuously moving sheet of material 12 is comprised of first and second respective blocks 14 and 16 and a plurality of stacked laminated sheets 18. Blocks 14 and 16 have formed therein respective nozzles 20 and 22 which are in alignment with one another and are separated by a distance sufficient to receive the sheet of material passing therethrough. Means for admitting pressurized fluid to first and second nozzles 20 and 22 to sense an average variation in the back pressure therefrom, which variation is proportional to a change in the thickness of the sheet of material being monitored, is provided by first and second passageways 24 and 26 within first block 14, first and second passageways 28 and 30 and a port 32 within second block 16, and a passageway 34 formed within the stacked laminated sheets by a hole 35 in each laminated sheet 18, which hole is aligned with the hole in the adjacent laminated sheet. Passageway 24 is fluidically connected between passageway 26 and nozzle 20, and passageway 28 is fluidically connected between port 32 and nozzle 22. Port 32 is also fluidically connected to passageway 30, and passageway 34 fluidically connects passageways 28 and 30 together. Each of sheets 18 also has holes 36 and 38 therethrough for receiving respective locating dowels 40 and 42, which dowels are, in turn, positioned within suitable holes in blocks 14 and 16 for assisting in the final assembly of the sensor head. Each of sheets 18 further includes a plurality of holes 44 for receiving a plurality of bolts 46 which pass through respective holes 48 in block 14 and are threaded into respective tapped holes 50 in block 16 to fasten the assembled components of the sensor head together.

Blocks 14 and 16 can be comprised of any suitable wear-resistant material, such as anodized or teflon-coated aluminum, a wear-resistant steel alloy, etc., in order to prevent wearing of, or abrasion to, the adjacent surfaces of nozzles 20 and 22, which abrasion could undesirably change the calibration of the sensor head. Laminations 18 can be comprised of any suitable material, such as chemically etched or stamped stainless steel.

In operation, pressurized fluid is admitted to nozzle 20 from a source of fluid pressure (not shown) via a tubing 52, port 32, and passageways 30, 34, 26 and 24, and pressurized fluid is admitted to nozzle 22 from port 32 via passageway 28. As the pressurized fluid exits respective nozzles 20 and 22 and passes between the respective adjacent surfaces of the nozzles and the respective sides of the sheet of material passing between the nozzles, a back pressure is developed within the nozzles, the average of which is sensed at port 32 and monitored by suitable pressure monitor (not shown). A pressure transducer (not shown) senses variations in the sensed back pressure, which variations are proportional to changes in the thickness of the material being monitored. As the sheet of material increases in thickness, the clearance between the material and the adjacent nozzle surfaces decreases, thus causing an increase in back pressure, and in the same manner, a decrease in the thickness of material causes a decrease in sensed back pressure. Since the back pressures from nozzles 20 and 22 are averaged within port 32, the averaged back pressure is insensitive to the position of the sheet of material within the gap between nozzles 20 and 22. That is, for a given thickness, movement of the material toward one nozzle causes the back pressure therewithin to increase, which increase is negated by the decrease in back pressure within the other nozzle caused by the movement of the opposite side of the material away from the other nozzle.

Although the thickness of material 12 is shown in FIG. 3 to be so small so that the clearance between the material and the adjacent nozzles is greater than the diameter of the respective nozzles, this representation is merely shown for illustrative purposes. In fact, the clearance between the respective nozzles and the respective adjacent sides of the sheet of material is ideally set at a distance which is ten percent or less than the respective nozzle diameters in order to insure that changes in thickness produce linear changes in back pressure within the respective nozzles. Thus, for this reason, when monitoring the actual thickness of the sheet of material having a particular nominal thickness, the gap between nozzles 20 and 22 is precisely set to insure linearity of pressure readout readings with respect to changes in product thickness, and to insure a maximization in gain of the sensor as defined by the change in back pressure divided by the change in material thickness. Thus, the gap between nozzles 20 and 22 is set by the selection of a predetermined number of laminations 18, wherein each lamination has a specified thickness, in order to maximize the gain and insure linearity of operation of the sensor. In this manner, a first sheet material having a particular nominal thickness can be monitored using a specified number of laminations, and then the same sensor can be used to monitor a second sheet of material having a different nominal thickness using a different number of laminations to insure satisfactory results. After completion of the monitoring of the second sheet of material, if it is desired that an additional quantity of the first sheet of material having the first nominal thickness again be monitored, the original number of laminations are again positioned between blocks 14 and 16, thereby insuring that sensor 10 has exactly the previous gap setting between the nozzles to insure exact replication of results. Thus, by quickly disassembling sensor 10, and adding or removing the number of laminations positioned between blocks 14 and 16, one sensor head can be suitably used to monitor various sheets of material having wide ranges of nominal thicknesses with accurate and repeatable results.

Although the invention has been described with reference to a specific embodiment thereof, numerous modifications are possible without departing from the invention, and it is desirable to cover all modifications falling within the spirit and scope of this invention.

What I claim as new and desire to secure by Letters Patent of the United States is:

1. A pneumatic sensor head for monitoring the thickness of a continuously moving sheet of material passing therethrough, comprising:
    a. first and second blocks having respective first and second aligned nozzles separated by a distance sufficient to receive the sheet of material passing therethrough;
    b. means for admitting pressurized fluid to said first and second nozzles to sense an average variation in the back pressure therefrom proportional to a change in the thickness of the sheet of material being monitored;
    c. a plurality of removable stacked laminated sheets positioned between said first and second blocks for adjusting the distance between said first and second nozzles, whereby to enable optimum operation of said sensor head over wide variations in nominal thicknesses of monitored sheets of material, each of said laminated sheets having a hole therethrough in alignment with the hole in an adjacent one of said laminated sheets to form a passageway therein; and
    d. said admitting means comprising passageway means within said first block, passageway means and a port within said second block and said passageway formed within said stacked laminated sheets, said passageway within said first block being fluidically connected between said first nozzle and said passageway formed within said stacked laminated sheets, and said passageway means within said second block being fluidically connected to said second nozzle, said port and said passageway formed within said stacked laminated sheets.

2. A pneumatic sensor head according to claim 1, wherein said passageway means within said first block is comprised of first and second passageways therein, one end of said first passageway being fluidically connected to said first nozzle, and said second passageway being fluidically connected between another end of said first passageway and said passageway formed within said stacked laminated sheets.

3. A pneumatic sensor head according to claim 1, wherein said passageway means within said second block is comprised of first and second passageways therein, said first passageway being fluidically connected between said second nozzle and said port, and said second passageway being fluidically connected between said port and said passageway formed within said stacked laminated sheets.

* * * * *